(12) United States Patent
Gunnarsson et al.

(10) Patent No.: US 8,538,325 B2
(45) Date of Patent: Sep. 17, 2013

(54) MONITORING CELLULAR RADIO ACCESS NODE PERFORMANCE

(75) Inventors: Frederik Gunnarsson, Linköping (SE); Stefan Engström, Linköping (SE); Meta Landstedt, Linköping (SE); Johan Moe, Mantorp (SE); Robert Petersen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 553 days.

(21) Appl. No.: 12/885,060

(22) Filed: Sep. 17, 2010

(65) Prior Publication Data

US 2012/0071085 A1 Mar. 22, 2012

(51) Int. Cl.
*H04B 1/60* (2006.01)
(52) U.S. Cl.
USPC .................................. 455/9; 455/7; 370/315
(58) Field of Classification Search
USPC .......................... 455/7–11, 14–25; 370/315
See application file for complete search history.

(56) References Cited

U.S. PATENT DOCUMENTS

2011/0208842 A1 8/2011 Mildh et al.

OTHER PUBLICATIONS

3GPP TSG-SA3, S3-100737, SA3#60, Jun. 28-Jul. 2, 2010.*
Next Generation Mobile Networks (NGMN), NGMN Use Cases related to Self Organising Network, Overall Description, May 31, 2007, pp. 1-17.
3GPP TS 23.401 V10.0.0 (Jun. 2010) Release 10, TOC and pp. 25-30.
GPP TS 36.300 V10.0.0 (Jun. 2010) Stage 2 Release 10, TOC and pp. 62-71.
International Search Report and Written Opinion, Jan. 5, 2012 corresponding Application No. PCT/SE2011/051074.
3GPP TSG-SA3 (Security); S3-100737; SA3#60, Jun. 28-Jul. 2, 2010, RN remote configuration security, China Mobile, URL: http://www.3gpp.org/ftptsb_sa/wg3_security/TSGS3_60_Montreal/Docs.
3GPP TR 36.806 V9.0.0 (Mar. 2010); Technical Specification Group Radio Access Network; Evolved Universal Terrestrial Radio Access (E-UTRA; Relay architectures for E-UTRA (LTE-Advanced) (Release 9).
3GPP TS 36.300 V10.0.0 (Jun. 2010); Technical Specification Group Radio Access Network; Evolved Universal Terrestrial Radio Access Network (E-UTRAN); Overall description; Stage 2 (Release 10).

* cited by examiner

*Primary Examiner* — Raymond Dean
(74) *Attorney, Agent, or Firm* — Nixon & Vanderhye P.C.

(57) ABSTRACT

The technology described in this application provides a way for an O&M node or system to configure, monitor, and manage relay nodes efficiently. A base station serves a relay node in a cellular communications system that also includes the O&M node. A relay node O&M data context for the relay node is established in a memory associated with the base station. O&M data pertaining to the relay node is stored in the relay node O&M data context. The information in the relay node O&M data context is different than O&M data pertaining to the base station. The base station performs, on behalf of the relay node, O&M-related communications using the O&M data in the relay node O&M data context.

29 Claims, 7 Drawing Sheets

MONITORING CELLULAR RADIO ACCESS NODE PERFORMANCE

TECHNICAL FIELD

The technical field relates to radio communications, and more particularly, to the monitoring and management of cellular radio access relay nodes.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on is radio frequencies with the user equipment units (UE) within range of the base stations.

In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology where the radio base station nodes are connected directly to a core network rather than to radio network controller (RNC) nodes. In general, in LTE the functions of a radio network controller (RNC) node are distributed between the radio base stations nodes (eNodeB's in LTE). As such, the radio access network (RAN) of an LTE system has an essentially "flat" architecture comprising radio base station nodes without reporting to radio network controller (RNC) nodes.

It is desirable that a wireless network be simple to deploy and cost efficient to operate. There is also current interest in having the network be self-organizing where possible. Furthermore, good coverage is important for a mobile broadband experience—both outdoors and indoors. But changes in a wireless environment affect the quality of signal transmitted and received, and reception power rapidly decreases in proportion to increasing distance between wireless communication entities. As a result, a wireless communication system may employ a relay node, repeater station, or the like to expand coverage and/or improve throughput, quality, etc. The term "relay node" (RN) is used hereafter to encompass relays, repeaters, and similar radio access network nodes that are directly connected to a base station either wirelessly, by wire, or by optical fiber. A relay node may use radio communications technology both for communicating user data between a mobile terminal and the relay node over the radio interface and for the transport connection between the relay node and a base station.

Although a relay node may be less sophisticated, expensive, and intelligent than a regular base station (BS), NodeB, eNodeB, or access point (AP), a relay node stills performs some of the same functions as a base station. The term "donor base station" is used to identify the base station that the relay node is currently using to connect to the backhaul network. A relay node performs an "amplify and forward" (AF) function where it amplifies a signal received from a BS/AP or a MS/UE and delivers the amplified signal to the MS/UE or the BS/AP. Some relays may perform a decoding and forward (DF) function as well as a scheduling function where communicated information is restored by performing demodulation and decoding on a signal received from the BS/AP or the MS/UE and generating the restored signal by performing coding and modulation which is then sent to the MS/UE or the BS/AP.

Radio access networks typically include some sort of network management node to support configuration, equipment management, fault management, performance management, etc. For example, in the 3G Long Term Evolution (LTE) system, base stations called eNodeBs are managed by a domain manager (DM), also referred to as an operation and support system (OSS). Sometimes the individual eNodeBs (eNBs) are handled by an element manager (EM), which is a part of the domain manager. A domain manager typically only manages equipment from the same vendor. Domain manager tasks include configuration of the network elements, fault management, and performance monitoring.

In performing operations and maintenance (O&M) functions like fault management and performance monitoring, significant amounts of data from events and counters are regularly transferred from the eNBs up to the domain manager. For relay nodes, one challenge with O&M architectures, e.g., like the O&M architecture in LTE, is the timing of transporting O&M data, such as fault and performance data in the form for example of counter values and events, over the radio interface. The transport of O&M data is triggered by the domain manager or when an event occurs, which means that the time of transport is typically not aligned with the radio resource management of the donor base station often putting an unnecessary strain on those resources at that time.

Another problem is that a relay node may be unavailable at times, for example due to inactivity and energy efficiency actions, or because the relay node is being relocated. During such times, the O&M system is unable to contact the relay node to acquire fault and performance data or to send configuration information. Moreover, neighboring base stations are unable to send configuration information requests to the relay node.

Yet another problem with typical O&M architectures is that the relay node may change its donor base station over time. As a result, information about the relay node in the source donor base station must be provided to and stored in the target donor base station. It would be desirable to have an efficient way to provide such relay node information to the target donor base station that does not necessarily involve the relay node.

SUMMARY

The technology described in this application provides a way for an O&M node or system to configure, monitor, and manage relay nodes efficiently. A base station serves a relay node in a cellular communications system that also includes the O&M node. A relay node O&M data context for the relay node is established in a memory associated with the base station. O&M data pertaining to the relay node is stored in the relay node O&M data context. The information in the relay node O&M data context is different than O&M data pertaining to the base station. The base station is performs, on behalf of the relay node, O&M-related communications using the O&M data in the relay node O&M data context. The base station can do this for multiple relay nodes being served by the base station by establishing a relay node O&M data context corresponding to each of the multiple relay nodes.

In a non-limiting example embodiment, the base station may be a communications proxy for the relay node with respect to communications to and from the O&M node. The base station responds to an O&M data request from the O&M node concerning the relay node without having to involve the relay node. The base station sends O&M data to the O&M node concerning the relay node without having to involve the relay node. As one example, the base station can respond to the O&M data request from the O&M node concerning the relay node when the relay node is inactive or unavailable. Another example is the base station responding to the O&M data request from the O&M node concerning the relay node or sends O&M data to the O&M node concerning the relay node to the relay node based on communications resource scheduling determined by the base station independent from when the O&M data is sent by the relay node or the O&M node.

In one non-limiting example embodiment, the base station explicitly or implicitly marks the O&M data pertaining to the relay node with an O&M data validity indicator. An example implicit O&M data validity indicator might be a time stamp set by the relay that is transparently sent from the base station to the O&M node. As a result, the O&M node can request and receive the latest O&M data collected for the relay node, while the base station is also collecting fresh data for the relay node. The O&M data validity indicator can be "tagged" either by the relay (implicit) or the base station (explicit) and can expressed in any suitable way. For example, a time stamp or time period may indicate what the data relates to or when the data is not to be trusted any more, e.g., best before date. Another non-limiting example includes one or more flags such as a "suspect" flag or flags.

One possible beneficial option is to provide O&M information pertaining to the relay node obtained from the relay node O&M context to one or more neighboring base stations.

Some non-limiting examples of O&M-related communications the base station may perform, on behalf of the relay node, include configuring the relay node using O&M information stored in the relay node O&M context, providing software to the relay node using O&M information stored in the relay node O&M context, and/or updating the relay node O&M context using information from the relay node during a time period when the O&M node is not permitted to obtain O&M data pertaining to the relay node from the base station., Non-limiting examples of O&M data includes one or more of relay node configuration data, management data, fault data, or event data. The base station may obtain O&M data for the relay node O&M context from a variety of sources. Non-limiting examples include: the relay node, another base station, or the O&M node. The donor base station may obtain O&M data for the relay node O&M context by inspecting signaling to and/or from the relay node.

When the relay node is to be handed over to a target base station, at least a part of the relay node O&M context is preferably transferred to the target base station.

DETAILED DESCRIPTION

Figure 1:
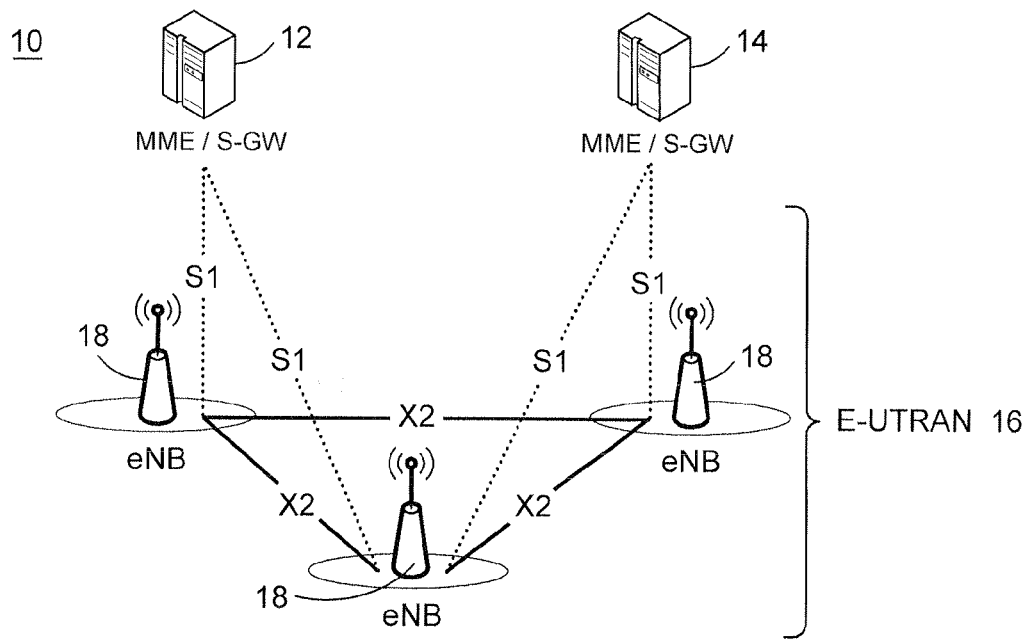
FIG. 1 illustrates a non-limiting example LTE wireless communications system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology may be used in any type of cellular radio communications. For ease of description, the term "radio terminal" encompasses any kind of radio communications terminal/device like user equipment (UE), mobile station (MS), PDAs, cell phones, laptops, etc. Although the technology described in this application may be used in any cellular radio communications system, for illustration purposes only, a non-limiting example is described in the context of an LTE system such as that shown in FIG. 1. The LTE architecture includes logical interfaces between eNBs 18 (interface X2) and between each eNB and core network Mobility Management Entity (MME)/Serving Gateway (S-GW) node 12, 14 (interface S1). The is radio access portion of the network is referred to as an enhanced-UMTS Terrestrial Radio Access Network (E-UTRAN) 16, where UMTS stands for Universal Mobile Telecommunications System. In LTE, the downlink is based on orthogonal frequency division multiplexing (OFDM), and the uplink is based on a single carrier modulation method known as discrete Fourier transform spread OFDM (DFT-S-OFDM). Most decisions related to the radio access network are distributed to the eNB. One example is handover, where the mobile terminal moves from a source eNB to a target eNB. The procedure is supported by signaling between the eNBs over X2 (or S1).

Figure 2:
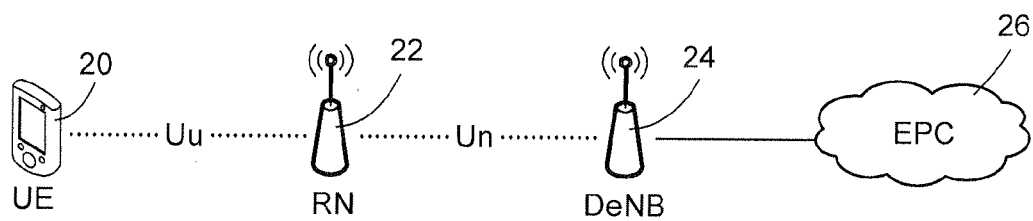
FIG. 2 illustrates a non-limiting example of an LTE wireless communication using a relay node (RN)

Self-backhauling relay nodes (RNs) for LTE Advanced extend LTE Release 8 by supporting relay nodes as a way to improve, e.g., the coverage of high data rates, group mobility, temporary network deployment, the cell-edge throughput, and/or to provide coverage in new areas. FIG. 2 shows a relay node (RN) 22 wirelessly connected to a donor cell of a donor base station, referred to in LTE as a donor eNB (DeNB) 24, via a Un radio interface, and User Equipments (UEs) 20 connect to the relay node 22 over the Uu radio interface. The donor eNB 24 connects the relay node 22 to an evolved packet core (EPC) network 26. The Un radio connection between the relay node 22 and the donor eNB 24 can be inband, in which case the eNB-to-RN link shares the same frequency band with direct eNB-to-UE links in the donor cell, or outband, in which case the eNB-to-RN link does not operate in the same frequency band as direct eNB-to-UE links within the donor cell.

"Type 1" relay nodes are supported by LTE-Advanced and are used here simply as a non-limiting example. However, the technology in this application may be applied to any type of relay node. A Type 1 relay node is an inband relay node that controls one or more cells, each of which appears to a mobile terminal as a separate cell distinct from the donor cell. Each relay cell has its own Physical Cell ID (an identifier used by mobile radio terminals (UEs) to identify the cell) and transmits its own synchronization channel, reference symbol, etc. In a single-cell operation, the mobile terminal receives in the downlink scheduling information and data transmission feedback directly from the relay node and sends in the uplink data and control channel information to the relay node. A Type 1 relay node appears as an eNodeB to legacy mobile terminals, i.e., it is backwards compatible. A Type 1 relay node may also be nomadic, meaning that it may change donor eNBs over time, either via events such as handovers, or more disruptive events such as physical relocations of the relay node. It may also be inactive at times, for example, in order to save energy.

Figure 3:
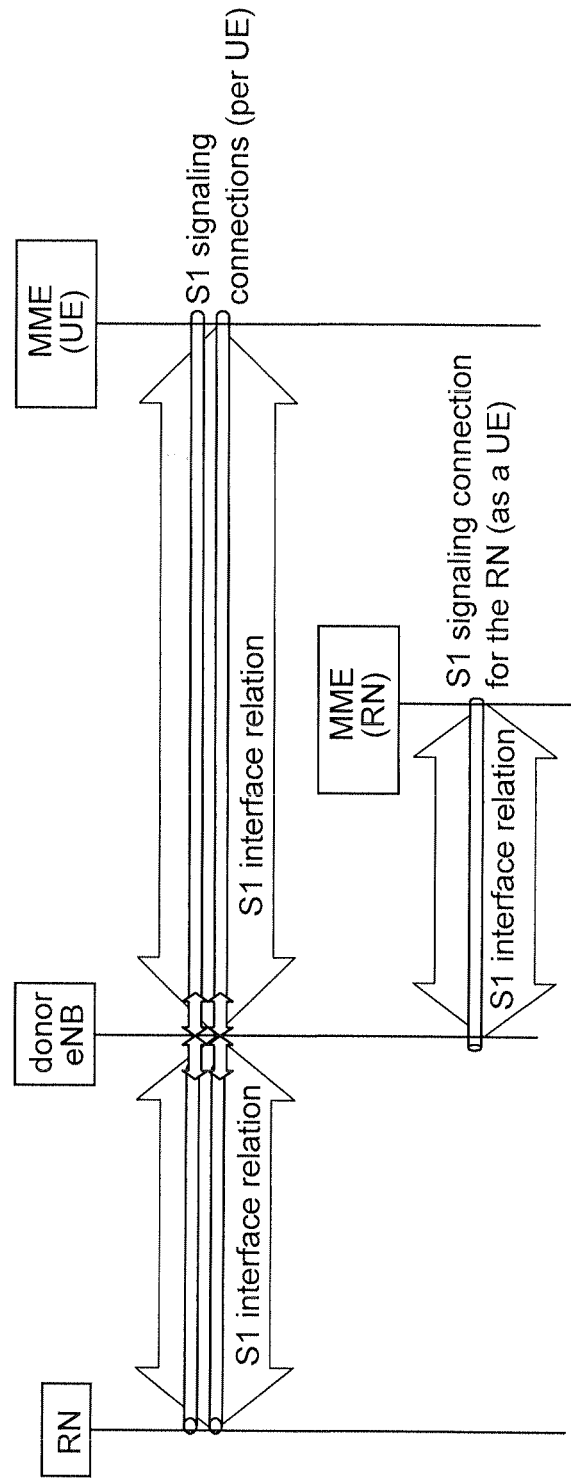
FIG. 3 is a non-limiting example signaling diagram showing a donor eNB acting as a proxy for the relay node.

FIG. 3 shows the S1 interface relationships established between a relay node (RN), a donor eNB, and the MME for each UE. The DeNB acts as an X2/S1 proxy for X2 and S1 connections between the relay node and the core network, which means that the DeNB is aware of the signaling content between the core network and the relay node as shown in the example of FIG. 3. In addition, X2 and S1 connections between a relay node and other eNBs are established partly over the radio interface Un.

Rather than having relay nodes establish and maintain their own O&M data/context, and O&M system node(s) retrieving relay node O&M data from each relay node, the problems identified in the background section with this approach are solved by establishing and maintaining a relay node O&M context in the donor base station DeNB for each of multiple relay nodes served by the donor base station. An O&M context is a data structure stored in memory of the DeNB that contains relay O&M information, non-limiting examples of which include performance data, fault management data, and configuration data. Non-limiting examples of performance data include reported radio link quality of served UEs, number of dropped calls, number of successfully completed calls, number of initiated calls. Some of this performance data can be obtained by the X2/S1 proxy in the DeNB inspecting X2 and S1 signaling. (The donor eNB in LTE performs an X2/S1 proxy function.) Non-limiting examples of mobile event data include an event-triggered report of a better cell in the vicinity, handover preparation information between base stations, handover execution information between base stations, and connection information to establish contact with another cell. Such events can also be grouped together as procedures, e.g., a handover procedure.

In one non-limiting example embodiment, the base station explicitly or implicitly marks the O&M data pertaining to the relay node with an O&M data validity indicator. An example implicit O&M data validity indicator might be a time stamp set by the relay that is transparently sent from the base station to the O&M node. As a result, the O&M node can request and receive the latest O&M data collected for the relay node, while the base station is also collecting fresh data for the relay node. The O&M data validity indicator can be "tagged" either by the relay (implicit) or the base station (explicit) and can expressed in any suitable way. For example, a time stamp or time period may indicate what the data relates to or when the data is not to be trusted any more, e.g., best before date. Another non-limiting example includes one or more flags such as a "suspect" flag or flags.

Figure 4:
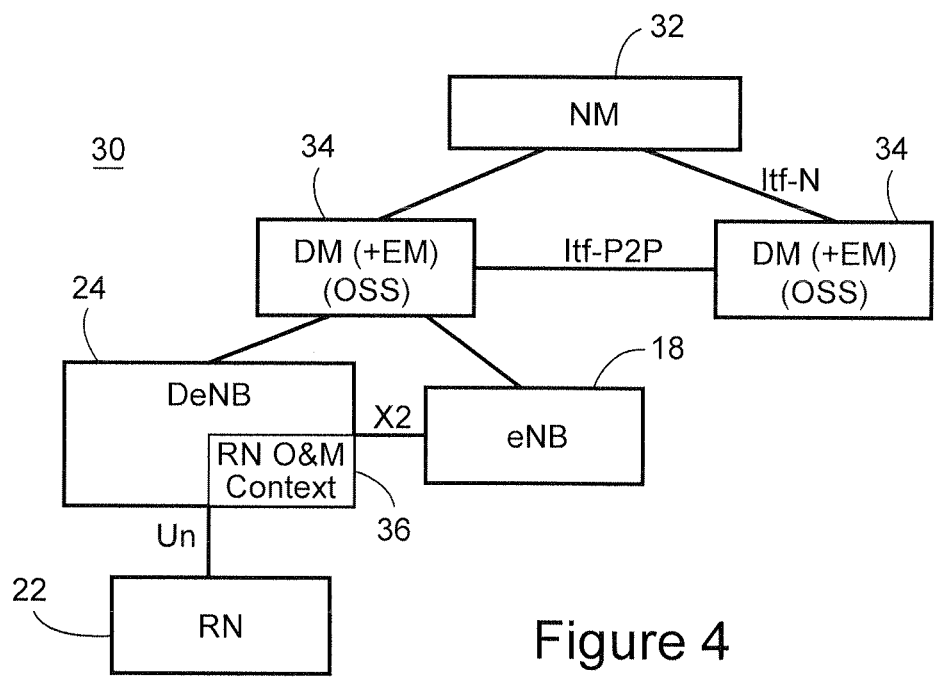
FIG. 4 illustrates a non-limiting example function block diagram of a network management system.

FIG. 4 shows a non-limiting, example network management system 30 in LTE. Each eNodeB 18 is managed by a domain manager (DM) 34, also referred to as an operation and support system (OSS) node or operations and maintenance (O&M) node. Sometimes the individual eNBs 18 are handled by an element manager (EM) in LTE, which is a part of the domain manager 34. Example O&M node/domain manager tasks include configuring the network elements, fault management, and performance monitoring such as receiving significant amounts of event and counter data from the eNBs 18. A domain manager 34 may further be managed by a network manager (NM) 32.

The interface between two domain managers 34 in the FIG. 4 example is referred to as Itf-P2P, and the interface between the network manager 32 and each domain manager 34 is referred to as Itf-N. Multi-vendor management can be handled either via a common network manager 32 or via the peer-to-peer domain manager interface Itf-P2P. Furthermore, the X2 interface between eNBs also supports some management. The X2 interface is standardized and therefore works between eNBs from different vendors. Typically, the domain manager interfaces are not standardized between different vendors. This is just an example of an O&M system useable in LTE. Other types of O&M nodes/systems may be used.

In LTE, an eNB capable of handling relay nodes has proxy functionality to terminate and forward the X2 and S1 protocols as shown in FIG. 1. When a relay node is associated to a DeNB, the DeNB starts acting as an S1/X2 proxy in order to support that relay node. As an S1/X2 proxy, the DeNB terminates and forwards the S1 and X2 protocols, which means that from the perspective of other network nodes, a relay node is perceived as a cell served by the DeNB. The DeNB provides S1 and X2 proxy functionality between the relay node and other LTE network nodes (other eNBs, MMEs, and S-GWs). The S1 and X2 proxy functionality includes passing UE-dedicated S1 and X2 signaling messages as well as GTP data packets between the S1 and X2 interfaces associated with the relay node and the S1 and X2 interfaces associated with other network nodes. Due to the proxy functionality, the DeNB appears as an MME (for S1), an eNB (for X2), and an S-GW to the relay node. The DeNB also provides S-GW/P-GW-like functionality for the relay node. This includes creating a session for the relay node and managing EPS bearers for the relay node, as well as terminating the S11 interface towards the MME serving the relay node. The relay node and DeNB also perform mapping of signaling and data packets onto EPS bearers that are setup for the relay node. Specific example S1 and X2 user and control plane protocol stacks for supporting relay nodes are included in sections 4.7.3 and 4.7.4 of 3GPP TS 36.300 V10.0.0 incorporated herein by reference.

The DeNB preferably (though not necessarily) acts as an O&M proxy between an operation and support system and the relay node. As an O&M proxy, the O&M connection between the O&M system and the relay node terminates in the proxy DeNB, and the DeNB has knowledge of and control over the O&M traffic between the relay node and the O&M system. The O&M interface between DeNB and the O&M system over the radio interface may be standardized or proprietary. If the DeNB does not act as an O&M proxy, then the DeNB is not aware of the content of the O&M information and thus cannot itself directly acquire that content. But the DeNB may still extract O&M-relevant information about the relay node because of its role as a transport network backhaul with O&M information "tunneled" between the O&M system and the relay node.

Since the donor eNB (DeNB) 24 is aware of some or all O&M data concerning a relay node 22, the DeNB 24 maintains a relay node (RN) O&M Context 36 for each served relay node 22 as shown in FIG. 4. The donor eNB preferably maintains a RN O&M context for each served relay node. If the DeNB acts as an O&M proxy, then the DeNB effectively has the same O&M information about the relay node as if the relay node was a cell (or several cells) of the DeNB. If the DeNB is not an O&M proxy, relay node relevant O&M information is still stored in the RN O&M context, though likely less extensive than if DeNB were an O&M proxy.

Figure 5:
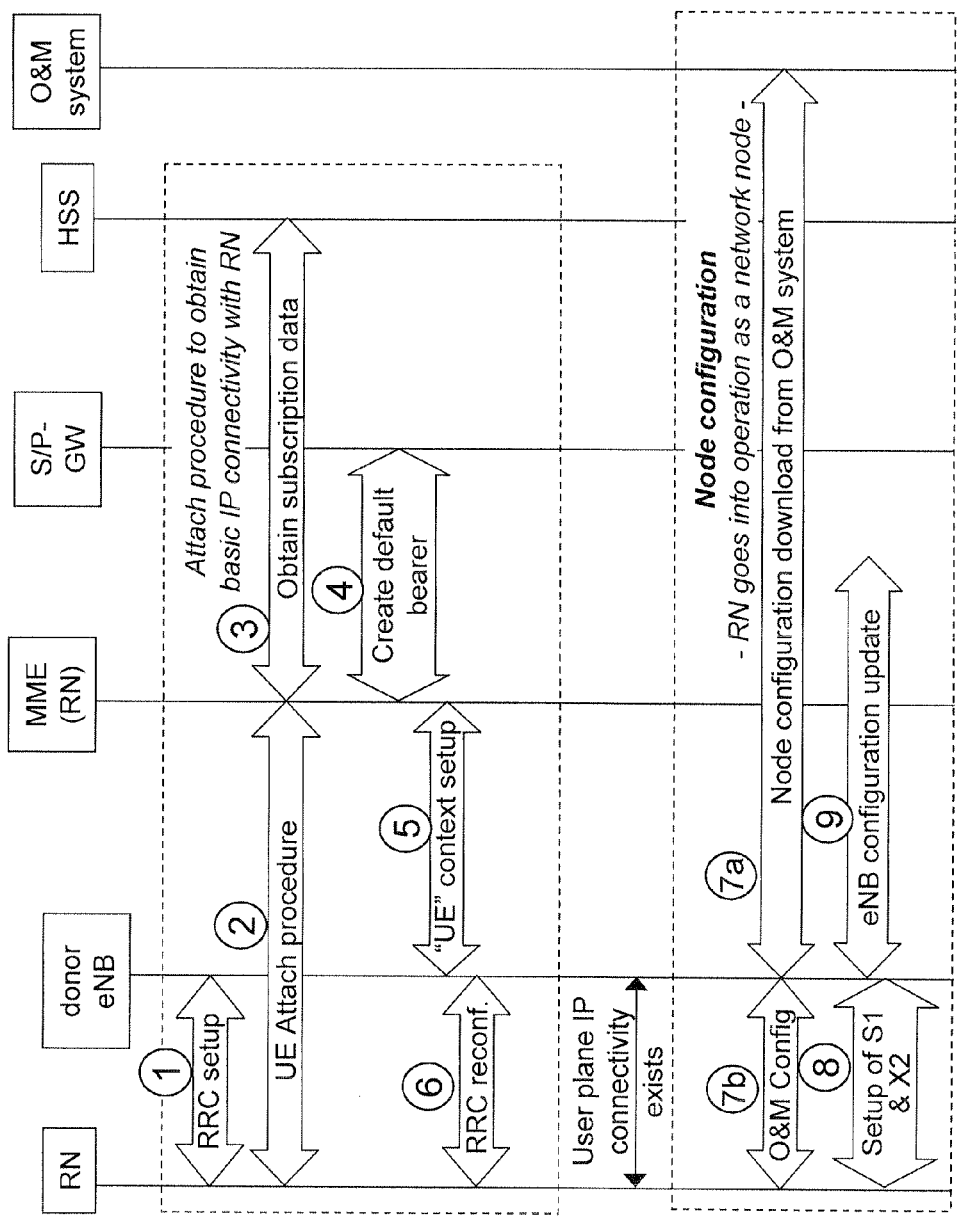
FIG. 5 is a signaling diagram illustrating one set of non-limiting example procedures for connecting and configuring a relay node.

FIG. 5 is a signaling diagram illustrating non-limiting example procedures in an LTE-based system for connecting and configuring a relay node. The relay node (RN) attaches to (registers with) the network in a similar way though not the exact same way as if it were a UE in signaling steps 1-6 which include: (1) RRC setup with the DeNB where the RN performs random access to the DeNB and a radio connection to the DeNB is established, (2) a UE Attach procedure where the RN signals to the MME to establish a bearer, (3) the MME checks with the subscription database HSS and obtains subscription details from the subscription database HSS, which informs the MME that this attach is for a relay node—something not done for UE attach, (4) create a bearer between the donor eNB and the S/P-GW, (5) perform a "UE" context setup where bearer information is stored in the DeNB as part of the relay node's context, and (6) complete the RRC reconfiguration by reconfiguring the radio link to correspond to the bearer(s).

At this point, user plane IP connectivity is established for the relay node. Rather than the RN establishing contact with its O&M system and acquiring configuration and/or software, in signaling step 7a, the DeNB establishes contact with the O&M system on behalf of the relay node and acquires configuration data and/or software upgrades, which is then stored in the RN O&M context at the DeNB for the relay node. Furthermore, storage in DeNB is allocated or reserved for additional data to be stored in that RN O&M context. In signaling step 7b, the DeNB then configures the relay node with the O&M data from the RN O&M context, and a path for O&M data to be transferred from the relay node to the DeNB is established. The DeNB can also send the relay node software it stored in the RN O&M context so that the relay node can upgrade it software. In signaling step 8, S1 and X2 connections between the relay node and the DeNB are established upon radio bearers created in the attach procedure, and in signaling step 9, the DeNB sends an eNB configuration update message to inform other eNBs (not shown) about the existence of the relay node cell served by the DeNB. At this point, the relay node is activated and in service.

Figure 6:
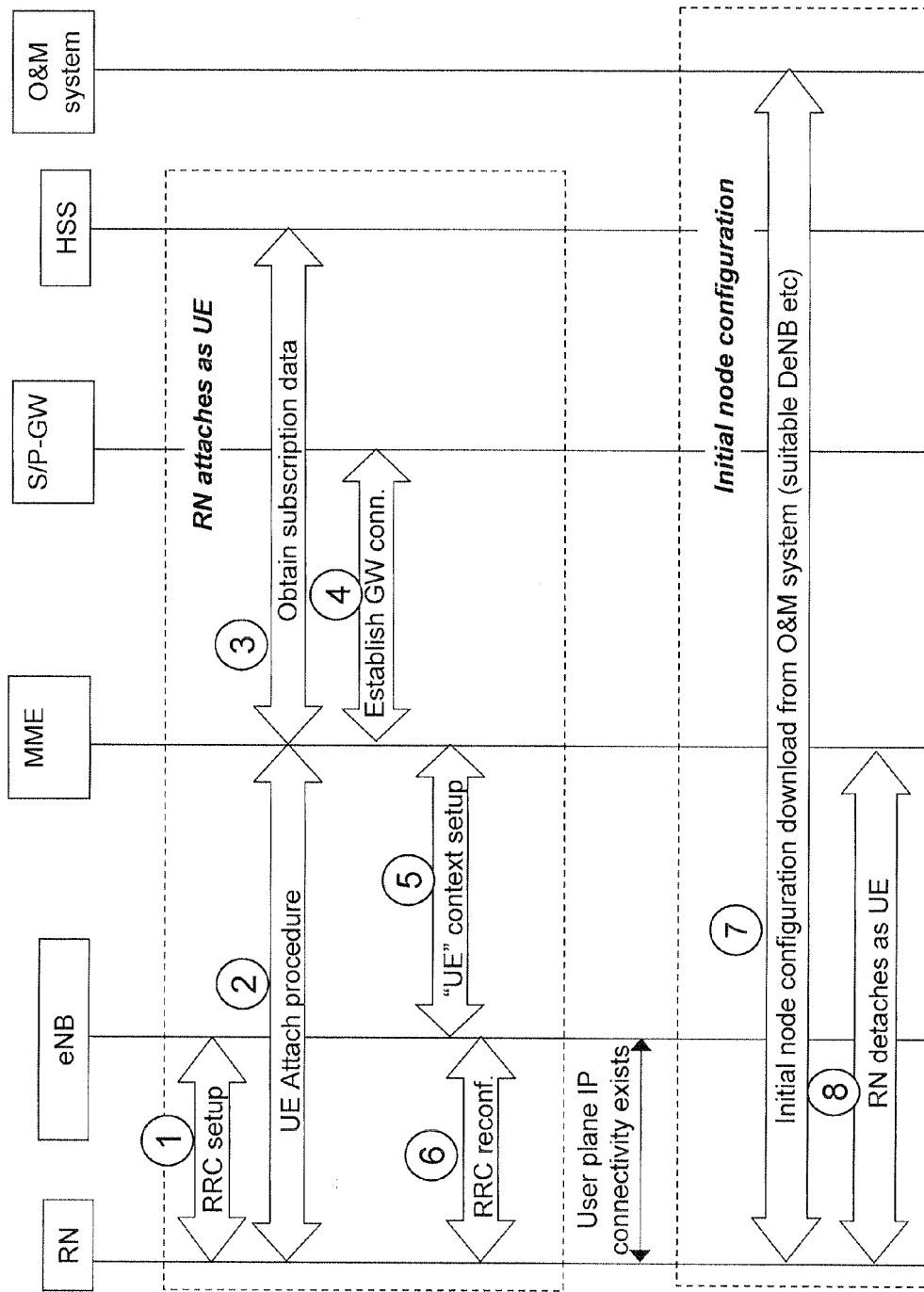
FIG. 6 is a signaling diagram illustrating another set of non-limiting example procedures for connecting and configuring a relay node.

FIG. 6 is a signaling diagram illustrating another set of non-limiting example procedures in an LTE-based system for an initial phase when connecting and configuring a relay node. The relay node (RN) attaches to (registers with) the network as any UE in order to obtain user plane IP connectivity. The signaling steps 1-6 include: (1) RRC setup with an eNB, which may not support RNs, where the RN performs random access to the eNB and a radio connection to the eNB is established, (2) a UE Attach procedure where the RN signals to the MME, which may not support RNs, to establish a bearer, (3) the MME checks with the subscription database HSS and obtains subscription details from the subscription database HSS, which informs the MME that this attach is for a relay node—something not understood by an MME not supporting RNs, (4) establish S/P-GW connectivity between MME and S/P-GW, (5) perform a "UE" context setup that may include an indication from the MME that this is a relay node, which eNB may be unable to understand if it does not support RNs, and (6) complete the RRC reconfiguration by reconfiguring the radio link to correspond to the bearer(s) for IP connectivity of a regular UE if the serving eNB or MME or both do not support RNs.

At this point, user plane IP connectivity is established for the relay node. The RN (7) establishes contact with its O&M system and acquires configuration information including a list of alternative eNBs that support RNs. At (8), the RN detaches as a UE and then attaches to a DeNB that supports RN as in the procedure described in FIG. 5, possibly indicating that it is a RN to the DeNB as part of the RRC setup (1). This is used by the DeNB to select an MME which supports RNs when forwarding the UE attach procedure to a MME (2).

The data in the RN O&M context can be acquired in different ways. One is from the relay node. The O&M data produced in the relay node is sent to the DeNB to be stored in the RN O&M context. Another is from the DeNB. As an S1/X2 proxy, the DeNB can derive data and statistics relevant to the relay node by inspecting the S1 and X2 signaling to/from the relay node, for example, at handover of connected UEs. A third way is from neighbor eNBs intended for the relay node. Such information from neighbor eNBs can be carried over X2 or S1 and sent to the DeNB. A fourth way is from the O&M system. The O&M system may reconfigure the relay node, and as an O&M proxy, the DeNB can inspect the O&M signaling and store information extracted from that signaling in the RN O&M context. The extracted information also may include software upgrades.

Non-limiting examples of RN O&M context data from the relay node includes: configuration data like cell identities, neighbor cell list, cell parameter configuration (random access configuration, handover parameters, etc.); radio performance data like radio link quality information, e.g., signal strength (DL RSRP, UL channel sounding, UE power headroom, UL interference, etc.), signal quality (RSRQ, CQI, radio channel rank, etc.), data buffer information, and packet delivery performance; node performance data like energy consumption and activity information; faults like software exceptions and alarms (bugs, license violations, etc.), hardware alarms (hardware failures, temperature warnings, theft and tampering alarms, etc.), unexpected behavior or identified anomalies; and events like statistics transferred as individual events, aggregated per procedure, or aggregated over a time period. Non-limiting examples of RN O&M context data from the DeNB include: session establishment performance; attempts, success, failures, delays; session maintenance performance; success, drops; handover performance; attempts, success, failure, and delays; traffic performance; bitrates over time, average, distribution, per flow and aggregated; neighbor eNB information and configurations. Non-limiting examples of RN O&M context data from the O&M system include configurations of the relay node and software upgrades.

Auto-integration refers to smooth introduction of new nodes in radio networks to provide a plug and play feel. The node is automatically configured before node start as compared to operation where configuration of the node occurs based on observations over periods of time. For relay node auto-integration, the relay node connects to the radio access network as described above in conjunction with FIG. 5 for example, the eNB is informed about the relay node status, and connectivity to the core network as well as the O&M system is established. At the same time, if the DeNB acts as an O&M proxy, the RN O&M context is established with information about the relay node configuration. The DeNB may take an active part in some of the configuration, for example to find a suitable set of initial neighbor cell relations. If the DeNB does not act as an O&M proxy, then the RN O&M context is also established, but instead O&M-relevant data is being extracted from, e.g., the X2/S1 proxy. Also local information such as the geographical position of the relay node may be acquired and stored in the RN O&M context. Memory is allocated in the DeNB to store the RN O&M Context. Recording of statistics from S1 and X2 flows associated to the relay node are initiated as configured from the O&M system, and the statistics is directed to the RN O&M Context. Relay node information such as hardware type, software version, radio capability, geographical position, etc. is retrieved from the relay node and stored in the RN O&M context. Most recent software upgrade package(s) is(are) identified from the O&M system, and if not already available in the DeNB, are downloaded to the DeNB and further transferred to the relay node. Optionally, the neighbor cell list in the RN O&M Context can be populated with all the neighbor cell of the serving cell of the relay node, and this information can be aligned with the corresponding information in the relay node as well as in the O&M system.

When the relay node is in operation, new O&M data is stored in the relay node O&M context in the DeNB (and possibly also in the relay node). O&M configuration data relating to the relay node is included along with fault management and performance data, and mobile terminal event data depending on data availability and whether the DeNB acts as an O&M proxy. Preferably, relay node neighbor information is also included.

The DeNB may acquire performance data, for example, by inspecting the packets that pass through the X2 and S1 proxy in the DeNB. For example, assume that a first cell served by a first eNB has a relay node in its neighbor cell, and the relay node is served by its DeNB, which is different from the first eNB. Further assume that the first eNB informs the relay node over X2 about a configuration change of the first cell. This first eNB communication terminates at the DeNB, which means that the DeNB can store the information in the RN O&M context and confirm the reception of the information to the first eNB without involving the relay node. This is useful, for example, if the relay node is "sleeping" in a power-save state. The information can be provided to the relay node when the relay node returns to an active state. Similarly, if the first eNB sends a request for information about the relay node over X2, then the DeNB can respond to that request using information already in the RN O&M context in the DeNB without involving the relay node (e.g., the relay node is still sleeping).

In addition, if the DeNB acts as an O&M proxy, the RN can signal O&M data to the DeNB concerning performance quantities that the DeNB is unable to acquire from the X2/S1 proxy, such as RRC signaling, mobile terminal measurements, relay node receiver measurements, etc. Consequently, the DeNB can respond to domain manager (DM) requests for O&M data, independent of the relay node's availability and whether there are sufficient radio resources at the time of request.

In one non-limiting example embodiment, the relay node O&M context may only store data for the ongoing reporting period, and data for previous reporting periods is deleted. In another non-limiting example embodiment, the RN O&M context stores data for the ongoing and a configurable number of previous reporting periods. Data is preferably time stamped. In yet another non-limiting example embodiment, the RN O&M context stores data for the ongoing and the previous reporting periods since the last time the O&M node acquired data from the RN O&M context.

In another non-limiting example embodiment, the RN O&M context stores alarms without forwarding them directly to the O&M node. For example, all alarms within a time window may be stored and sent at the end of a time window. Alternatively, the O&M node acquires the stored alarms regularly or on an as-needed basis from the DeNB.

The DeNB can respond to X2 messages on behalf of the relay node as a part of its role as an X2 proxy. With the support of the RN O&M context, the DeNB can respond to the X2 messages without including the relay node in the communication. For example, some X2 messages may contain information about the relay node such as cell configuration information, neighbor information, random access configuration information, antenna configuration information, etc.

In yet another non-limiting example embodiment, a configurable time window Tproc is defined for the time after the end of a reporting period during which the O&M node/system is not allowed to acquire data. This time window, preferably taking time-varying radio conditions into consideration, can then be used to send O&M data from the relay node to the DeNB for updating the RN O&M context in the DeNB in an efficient manner.

In yet another non-limiting example embodiment, O&M data from several RN O&M contexts can be combined into one file per reporting period. This may facilitate the O&M handling towards the O&M domain manager.

The relay node may change from one DeNB to another DeNB over time—relay node handover. There can be a number or reasons, including: the radio conditions from/to a different cell served by a different eNB being more favorable, either because the RN is mobile or because radio conditions have changed even though the RN remains at the same location, and the load of the serving DeNB is high and the RN is handed over to a different eNB. This means that the X2 and S1 connectivity needs to be updated. While this procedure is ongoing, communications between the relay node and other eNB can be handled by the DeNB with support from the RN O&M context. Accordingly, the relay node O&M context "moves" with the relay node from one DeNB to another DeNB when the relay node relocates, e.g., is handed over to another DeNB. As a result, the relay node availability in an O&M sense is the same as the availability of the DeNB.

Figure 7:
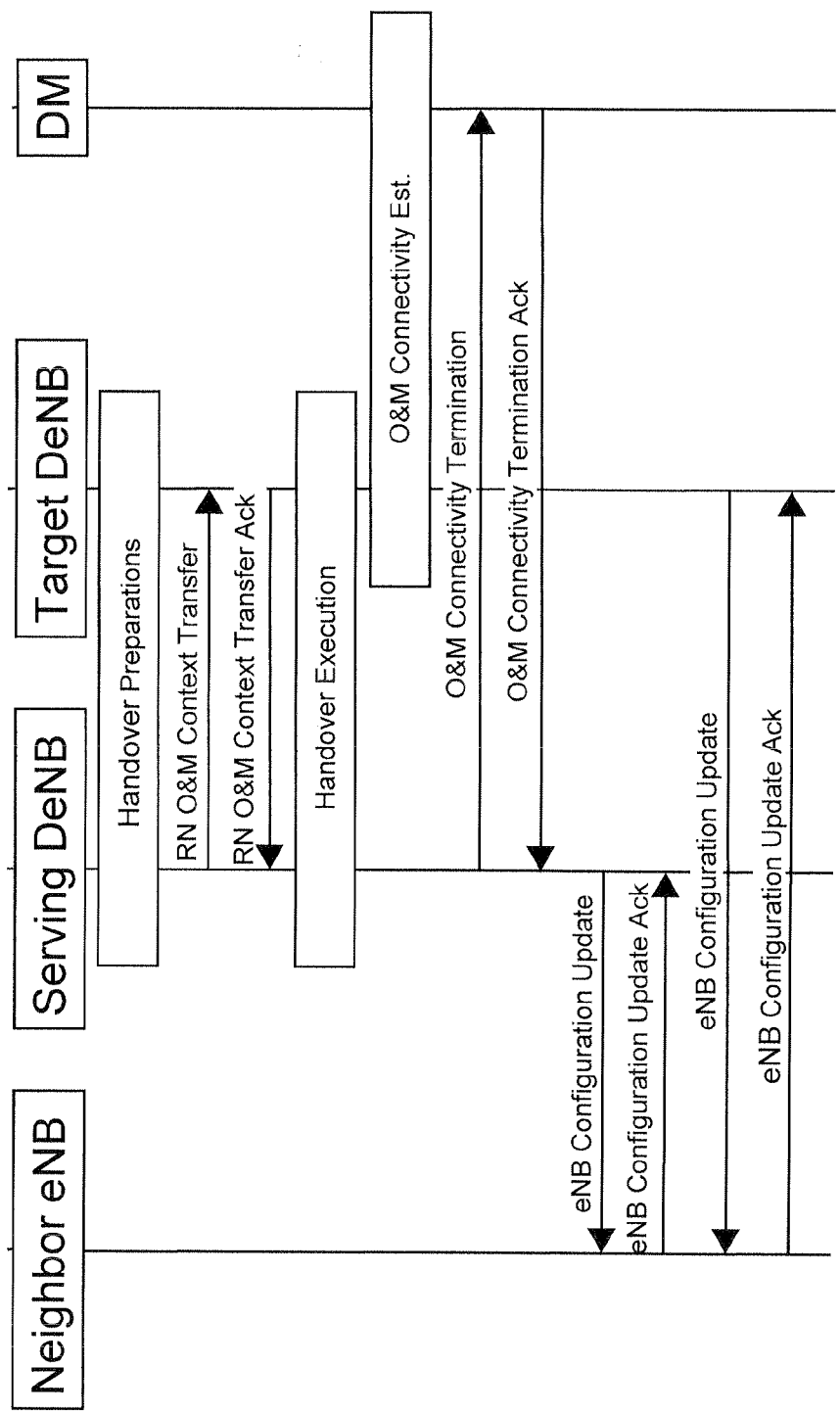
FIG. 7 is a signaling diagram illustrating non-limiting example procedures for handing over a relay node to another donor eNB.

FIG. 7 is a signaling diagram illustrating non-limiting example procedures for handing over a relay node to another donor eNB. First, relay node handover is prepared for in the target DeNB and the source DeNB, e.g., by the source DeNB sending a Handover Request message and the target eNB responding with a Handover Request Acknowledge message when resources are successfully prepared. Second, the stored information about the relay node including its RN O&M context and queued data packets are forwarded from the source to the target DeNB using for example an RN O&M Context Transfer message later acknowledged by the target DeNB. The relay node handover is executed, and the target DeNB establishes connectivity with the O&M domain manager. Third, the RN O&M context and O&M connectivity are released in the serving DeNB using O&M Connectivity Termination and O&M Connectivity Termination Ack messages. The serving DeNB also sends an eNB Configuration Update message to one or more neighbor eNBs to inform the them of the relay node handover, and the target DeNB follows with an eNB Configuration Update message to its neighbors and confirms acknowledgement.

Although the RN O&M context can be released at the source DeNB upon reception of the RN Context Transfer message, alternatively, the RN O&M context may be maintained at the source DeNB a configurable time to enable an efficient handling of frequent handovers between the same eNBs. In such cases, when the target DeNB already has stored an outdated RN O&M context for a relay node, then only the new or updated RN O&M context information needs to be sent to the target DeNB rather than all of the RN O&M context. Some part of the RN O&M context may be irrelevant for the new location, but other parts are still relevant, e.g., stored alarms.

Figure 8:
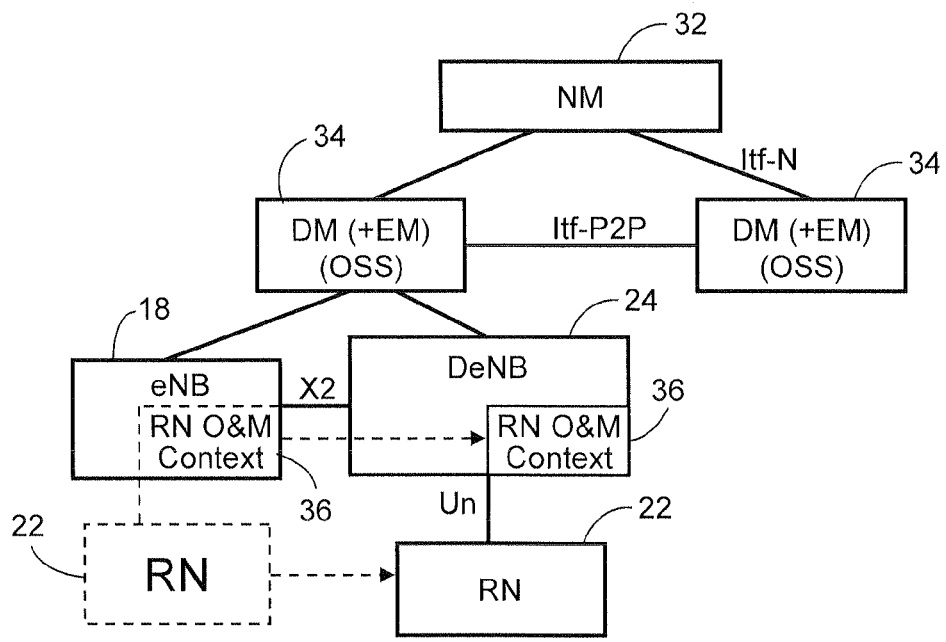
FIG. 8 illustrates a non-limiting example function block diagram of a network management system where the relay node is handed over to another donor eNB.

FIG. 8 shows an example of a relay node and its RN O&M context after a successful relay node handover to a different DeNB. This handover may be performed if the DeNB acts as an O&M proxy or not.

When a relay node is inactive, (e.g., due to failure, energy savings, maintenance, etc.), then the DeNB may respond to some signaling on the behalf of the relay node. For example, the DeNB may respond to O&M data transfer to from the O&M system and cell information to/from other eNBs. As a result, this kind of O&M information is available even though the relay node is not.

Upgrading the relay node software often means that software "packs" must be distributed to all relay nodes. With support from the RN O&M context, a software pack can be distributed to DeNBs, which in turn redistribute the software packs to served relay nodes when radio conditions are favorable and/or when there is free radio resource capacity. Relay node software upgrades performed in this way scales well with increasing numbers of relay nodes. The software pack may be the same for both eNBs and relay nodes or different.

Figure 9:
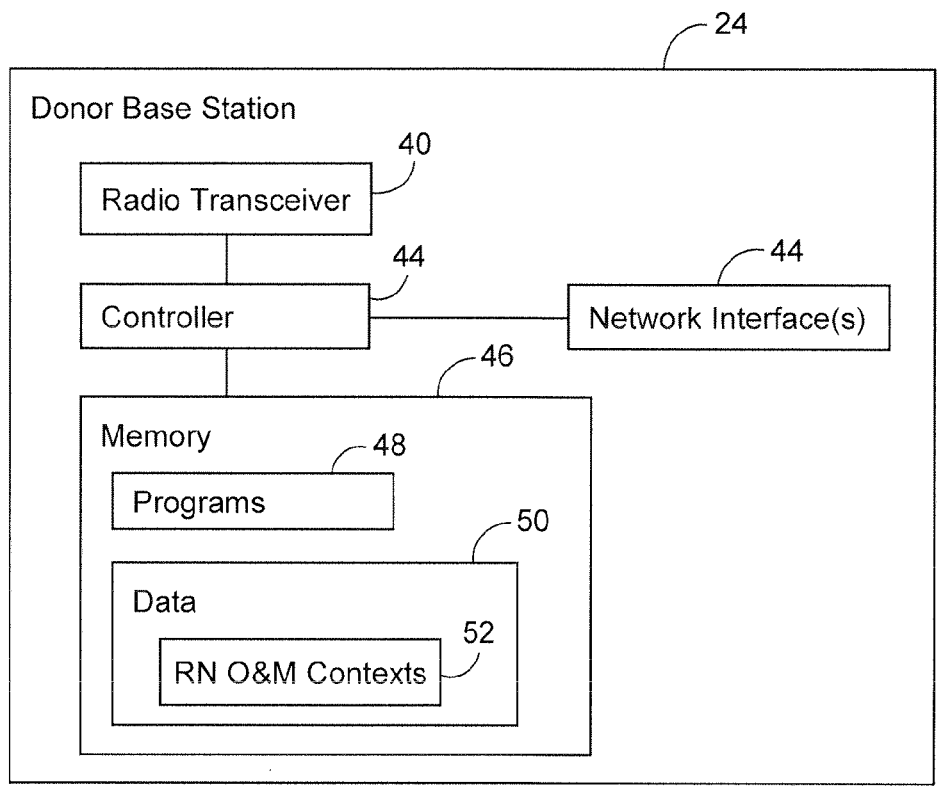
FIG. 9 is a non-limiting example function block diagram of a donor base station.

FIG. 9 shows a non-limiting example function block diagram of a donor base station that may be used to implement some or all of the functions described is above. The donor base station 24 includes a radio transceiver and typically multiple transceivers for communicating over the air interface with UEs and possibly also with a relay node if the connection between the donor base station and relay node is wireless. The radio transceivers are connected to one or more antennas not shown. The donor base station 24 is controlled by a controller 42 (e.g., a data processor) that is coupled to the radio transceiver(s) 40, one or more memories 46, and to one or more network interfaces 44. The network interface(s) 44 provide(s) for communication with network nodes like other base stations, possibly other radio network nodes like a base station controller, core network nodes like the MME/S-GW in LTE. The memory 46 stores program instructions which when executed by the controller 42 enable the donor base station to perform at least some of its necessary functions. As mentioned earlier, some base station functions may be performed using ASICs, DSPs, etc. The memory also stores data 50 for use by executing instructions, and in particular, relay node (RN) O&M context information (such as the example types of information described above) for each relay node for which the base station is operating as a donor base station.

In summary, a donor base station serving a relay node determines O&M data associated with that relay node, e.g., from observations of relay node signaling, receiving O&M data from the relay node, etc., and populates an RN O&M context for each relay node at the donor base station. As a result, the donor base station can promptly respond to O&M data requests from an O&M node and to configuration data requests from other base stations for the relay node without involving that relay node. Furthermore, software upgrades of relay nodes can be performed more efficiently using the donor base station managing the software distribution. The technology permits more efficient O&M data transfer over the radio interface since not all data needs to be transferred when it is acquired. Rather, the data transfer time over the radio interface can be also selected strategically to increase efficiency. Similarly, the technology permits more efficient X2 responses from the relay node because the donor base station, using an RN O&M context for a relay node, can respond to X2 signaling from other base stations more efficiently than if the relay node had to respond by itself. In other is words, relay node O&M availability is effectively on par with base station O&M availability. Distributed relay node O&M data aggregation and analysis that would not be feasible given the hardware limitations of most relay nodes can be performed using donor base stations. Moreover, efficient relay node software upgrade via donor base stations is possible which scales well with whatever number of relay nodes are currently involved.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for a base station serving a relay node in a cellular communications system that includes an operation and maintenance (O&M) node, comprising the base station:
   establishing in memory associated with the base station a relay node O&M data context for the relay node, where the information in the relay node O&M data context is different than O&M data pertaining to the base station;
   storing O&M data pertaining to the relay node in the relay node O&M data context; and
   performing, on behalf of the relay node, O&M-related communications using the O&M data in the relay node O&M data context.

2. The method in claim 1, wherein the base station performs the method of claim 1 for multiple relay nodes being served by the base station by establishing a relay node O&M data context corresponding to each of the multiple relay nodes.

3. The method in claim 1, wherein the base station is a communications proxy for the relay node with respect to communications to and from the O&M node, the base station responding to an O&M data request from the O&M node concerning the relay node without having to involve the relay node, and the base station sending O&M data to the O&M node concerning the relay node without having to involve the relay node.

4. The method in claim 3, wherein the base station responds to the O&M data request from the O&M node concerning the relay node when the relay node is inactive or unavailable.

5. The method in claim 3, wherein the base station responds to the O&M data request from the O&M node concerning the relay node or sends O&M data to the O&M node concerning the relay node to the relay node based on communications resource scheduling determined by the base station independent from when the O&M data is sent by the relay node or the O&M node.

6. The method in 3, wherein the base station explicitly or implicitly marks the O&M data with a validity indicator.

7. The method in claim 1, further comprising:
   providing to one or more neighboring base stations O&M information pertaining to the relay node obtained from the relay node O&M context.

8. The method in claim 1, further comprising:
   configuring the relay node using O&M information stored in the relay node O&M context.

9. The method in claim 1, further comprising:
   providing software to the relay node using O&M information stored in the relay node O&M context.

10. The method in claim 1, further comprising:
    updating the relay node O&M context using information from the relay node.

11. The method in claim 1, wherein the base station obtains O&M data for the relay node O&M context from one or more of the following: the relay node, another base station, or the O&M node.

12. The method in claim 1, wherein the donor base station obtains O&M data for the relay node O&M context by inspecting signaling to and/or from the relay node.

13. The method in claim 1, further comprising:
    when the relay node is to be handed over to a target base station, transferring at least a part of the relay node O&M context to the target base station.

14. The method in claim 1, wherein the O&M data includes one or more of relay node configuration data, management data, fault data, or event data.

15. Apparatus for a base station serving a relay node in a cellular communications system that is associated with an operation and maintenance (O&M) node, the apparatus comprising:
    a memory configured to store a relay node O&M data context for the relay node and O&M data pertaining to the relay node in the relay node O&M data context, where the O&M data stored in the relay node O&M data context is different than O&M data pertaining to the base station; and
    an electronic controller configured to perform, on behalf of the relay node, O&M-related communications using the O&M data in the relay node O&M data context.

16. The apparatus in claim 15, wherein the memory is configured to store a relay node O&M data context corresponding to each of multiple relay nodes served by the base station, and the electronic controller is configured to perform, on behalf of each of the multiple relay nodes, O&M-related communications using the O&M data in the corresponding relay node O&M data context.

17. The apparatus in claim 15, wherein the base station is a communications proxy for the relay node with respect to communications to and from the O&M node, and wherein the electronic controller is configured to: respond to an O&M data request from the O&M node concerning the relay node without having to involve the relay node and to send O&M data to the O&M node concerning the relay node without having to involve the relay node.

18. The apparatus in claim 17, wherein the base station responds to the O&M data request from the O&M node concerning the relay node when the relay node is inactive or unavailable.

19. The apparatus in claim 17, wherein the electronic controller is configured to respond to the O&M data request from the O&M node concerning the relay node or to send O&M data to the O&M node concerning the relay node to the relay node based on communications resource scheduling determined by the base station independent from when the O&M data is sent by the relay node or the O&M node.

20. The apparatus in claim 17, wherein the electronic controller is configured to explicitly or implicitly mark the O&M data with a validity indicator.

21. The apparatus in claim 15, wherein the electronic controller is configured to provide for communication to one or more neighboring base stations O&M information pertaining to the relay node obtained from the relay node O&M context.

22. The apparatus in claim 15, wherein the electronic controller is configured to provide O&M information stored in the relay node O&M context to configure the relay node.

23. The apparatus in claim 15, wherein the electronic controller is configured to provide software to the relay node using O&M information stored in the relay node O&M context.

24. The apparatus in claim 15, wherein the electronic controller is configured to update the relay node O&M context using information from the relay node.

25. The apparatus in claim 15, wherein the electronic controller is configured to obtain O&M data for the relay node O&M context from one or more of the following: the relay node, another base station, or the O&M node.

26. The apparatus in claim 15, wherein the electronic controller is configured to obtain O&M data for the relay node O&M context by inspecting signaling to and/or from the relay node.

27. The apparatus in claim 15, wherein when the relay node is to be handed over to a target base station, the electronic controller is configured to transfer at least a part of the relay node O&M context to the target base station.

28. The apparatus in claim 15, wherein the O&M data includes one or more of relay node configuration data, management data, fault data, or event data.

29. The apparatus in claim 15, wherein the cellular system is an LTE system, the base station is a donor eNode B, and the donor eNode B is configured to function as an O&M proxy for the relay node.

* * * * *

UNITED STATES PATENT AND TRADEMARK OFFICE
CERTIFICATE OF CORRECTION

| | | |
|---|---|---|
| PATENT NO. | : 8,538,325 B2 | Page 1 of 1 |
| APPLICATION NO. | : 12/885060 | |
| DATED | : September 17, 2013 | |
| INVENTOR(S) | : Gunnarsson et al. | |

It is certified that error appears in the above-identified patent and that said Letters Patent is hereby corrected as shown below:

In the Specification

In Column 3, Line 8, delete "station is performs," and insert -- station performs, --, therefor.

In Column 3, Line 56, delete "station.," and insert -- station. --, therefor.

In Column 5, Line 33, delete "The is radio" and insert -- The radio --, therefor.

In Column 11, Lines 18-19, delete "number or reasons," and insert -- number of reasons, --, therefor.

In Column 11, Lines 51-52, delete "inform the them of the relay node" and insert -- inform them of the relay node --, therefor.

In Column 12, Line 23, delete "described is above." and insert -- described above. --, therefor.

In Column 12, Line 64, delete "In other is words," and insert -- In other words, --, therefor.

In the Claims

In Column 13, Line 66, in Claim 6, delete "in 3," and insert -- in claim 3, --, therefor.

In Column 14, Line 29, in Claim 15, delete "Apparatus" and insert -- An apparatus --, therefor.

Signed and Sealed this
Eighth Day of July, 2014

Michelle K. Lee
*Deputy Director of the United States Patent and Trademark Office*